July 15, 1969 — A. M. MARKS — 3,456,135

GAS FLYWHEEL POWER CONVERTER

Filed March 15, 1965 — 4 Sheets-Sheet 1

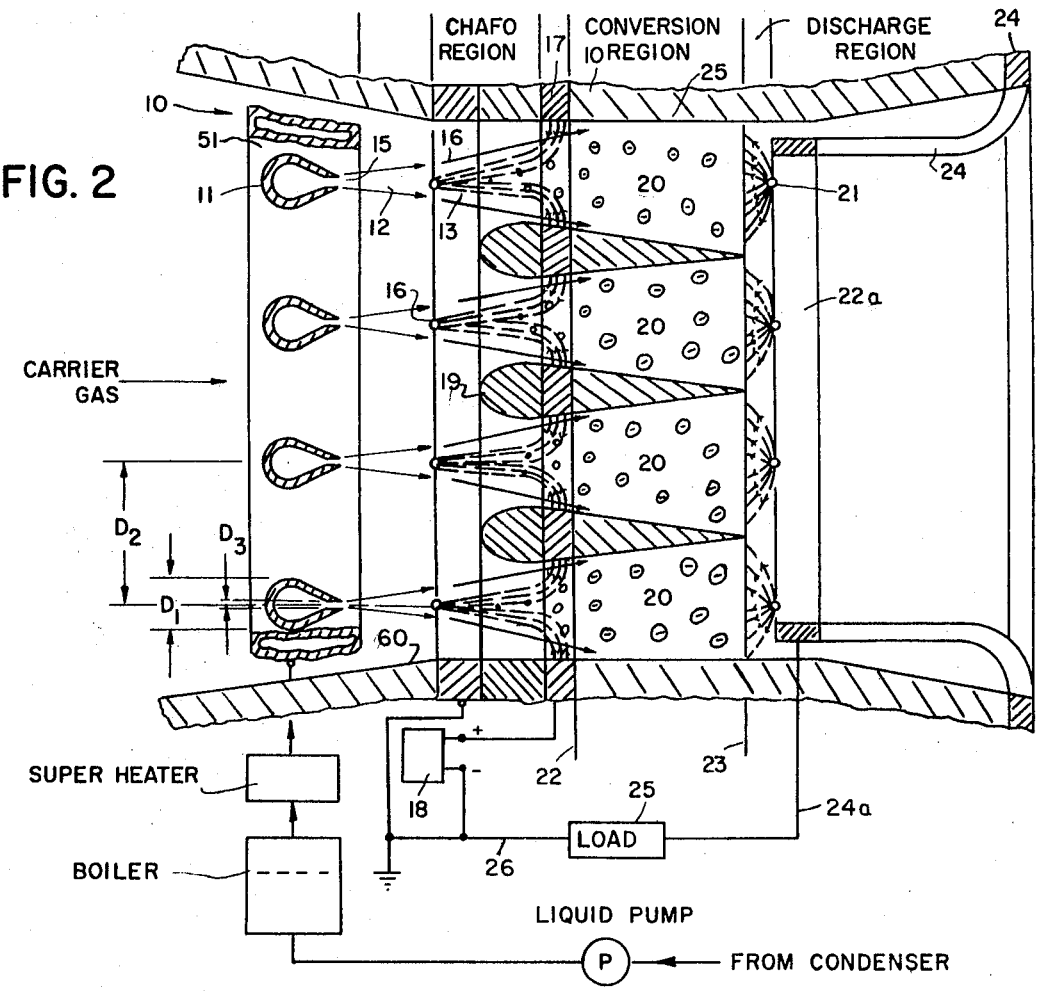
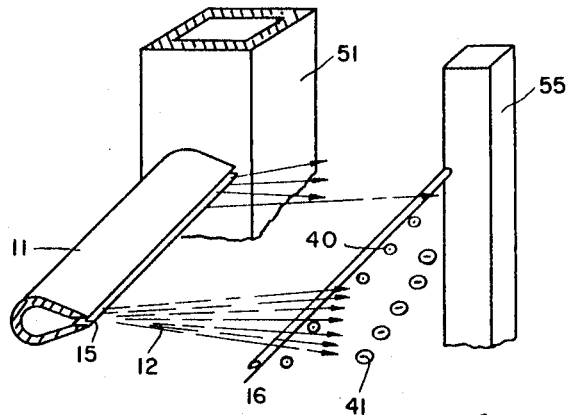

July 15, 1969    A. M. MARKS    3,456,135
GAS FLYWHEEL POWER CONVERTER
Filed March 15, 1965    4 Sheets-Sheet 4

INVENTOR.
ALVIN M. MARKS
BY Albert H. Krouner
ATTORNEY

United States Patent Office

3,456,135
Patented July 15, 1969

3,456,135
GAS FLYWHEEL POWER CONVERTER
Alvin M. Marks, 153—16 10th Ave.,
Whitestone, N.Y. 11357
Filed Mar. 15, 1965, Ser. No. 439,908
Int. Cl. H02k 45/00
U.S. Cl. 310—10    17 Claims

ABSTRACT OF THE DISCLOSURE

An electrothermodynamic power conversion device in which a carrier gas of low molecular weight is circulated within a closed loop. A vapor jet and an ion source are combined within the loop to form a charged aerosol within the carrier gas. A power conversion section including collector electrodes is disposed within the loop to convert a substantial portion of the kinetic power of the vapor jet into electrical power while a substantial kinetic power continues to circulate around the loop.

---

This invention relates to power conversion devices and more particularly to devices which will efficiently convert the heat-kinetic power of a charged aerosol-gas stream into electrical power, wherein a substantial part of the input thermal power per stage is extracted as electrical power output per stage.

The direct conversion of heat into electrical power through the medium of a charged aerosol is described in U.S. Patent No. 2,638,555, issued on May 12, 1953.

Other investigators tried to use ions to carry electric charges in a moving gas against an electric field, but the large ion mobility resulted in little or no power conversion. The problem of substantial and efficient heat-kinetic electric power conversion was solved through the use of charged particles of optimum small mobility. To have optimum mobility under suitable operating parameters, the charged aerosol particles must have an optimum ratio of radius to charge. With charged aerosol particles of such an optimum ratio of radius to charge, friction power loss is negligible due to the slippage of the charged particle relative to the gas stream when moving against an electric field of maximum intensity, yet with the charged particle radius no greater than necesary maximum electric power output results. The charged aerosol generator requires a gas of high electrical breakdown strength which is realizable in the entire temperature range below which the gas becomes ionized. Optimum operating parameters for a charged aerosol converter require a pressurized carrier gas averaging a low molecular weight and containing a small proportion of ion scavenger to increase the electrical breakdown strength. Super-cooling the charged aerosol gas in the conversion region further increases the electrical breakdown strength and electric power output.

The charged aerosol constitutes a novel electrothermodynamic medium with which may be performed a process in which the heat-kinetic power of a moving charged aerosol gas is converted to electric power fed to an external circuit. This process is substantially reversible when performed with negligible friction power losses in the manner herein described, so that useful electrothermodynamic cycles result.

The key to the functioning of the charged aerosol generator is in the simultaneous formation and charging of the charged aerosol in a moving gas, its utilization as a power transducer and discharge in a distance of a few millimeters.

The simultaneous formation and charging of an aerosol may be accomplished by direct condensation of a vapor upon gaseous ions produced by a corona discharge. In this method, a moving gas containing a vapor is transported to the vicinity of gaseous ions and the vapor is cooled below its condensation temperature by expansion or by mixing with a cooler carrier gas. Thereby the vapor condenses liquid droplets upon the ions to form a charged aerosol gas stream.

Experiments using this method show that the cost of creating the charged aerosol is less than 0.1% of the output electric power.

The charged aerosol generator utilizes a monopolar gas containing charged particles of optimum small mobility. The charged aerosol creates an electric potential hill against which the charged particles do work; thereby the heat-kinetic power of the gas is converted to electric power. In effect, the charge is locked into the gas, and any work done by the charged particles in an electric field is furnished by the moving gas to the electric circuit; or vice versa. The process is reversible, and therefore, may be used in a generator, compressor or thrustor.

If the output electric power density of the charged aerosol converter is a small proportion of the heat-kinetic power density available from the gas stream, then to convert a substantial proportion many stages are required.

To illustrate the problem, a test of a charged aerosol device was made utilizing an air-water aerosol at about 5 atmospheres pressure in which gas velocity was about 330 meters per second. In this test, the kinetic power of the carrier gas was of the order of 100 times that converted to electric power output.

A promising solution to the problem of equating the kinetic power input of the gas to the electric power output in one or several stages involves the utilization of a gas of low molecular weight and high electric breakdown strength at pressures of 10 to 100 atmospheres.

The present invention provides another solution to the problem of equating the kinetic power input to the electrical power output employing a device which is herein termed a Gas Flywheel Generator. In this device, a gas of low molecular weight, high electric breakdown strength, and at high pressure, is permanently contained in a hollow torus. The heat-kinetic power of the gas stream circulates in a hollow torus, where it rotates in much the same manner as a flywheel. The gas flywheel is set into motion by one or more internal charged aerosol jets; which, for example, may comprise steam which has been expanded to sonic velocity, and converted to a charged aerosol in a manner hereinafter described.

Transfer of kinetic power between a jet and a driven gas has heretofore depended on the turbulent mixing of the jet vapor and driven gas at different velocities. This resulted in imperfect momentum transfer between the molecules of the vapor and the driven gas, and hence inefficient transfer of kinetic power. However, in the present device, the almost instantaneous conversion of the jet vapor to discrete charged aerosol particles results in an almost perfect momentum transfer from the charged aerosol jet to the driven gas flywheel. Substantially no loss of kinetic power occurs since turbulence is avoided.

In the gas flywheel charged aerosol generator, a jet of large kinetic power density input, but of small cross section, is matched to a much larger electrical converter cross section, but of much smaller electric power density output. The gas flywheel stores kinetic power and provides the high velocity required for transporting the charged aerosol through the conversion space.

The kinetic power flow stores by circulation in the high velocity carrier gas of the gas-flywheel may be of the order of 10 to 100 times the electric power output. Yet the input kinetic power furnished by the jets may be only slightly greater than the electric power output to the load.

The output electric power equals the input jet power less the power lost to (a) wall friction around the loop and to (b) the charged particle slip in the conversion region. These friction power losses are made negligible, according to the principles herein set forth.

The device of the present invention provides a high conversion efficiency in a single stage. This is accomplished because the thermal power input of superheated vapor is subjected to a substantial temperature drop which is converted to the kinetic power of a charged aerosol jet at sonic velocity (Mach 1). The charged aerosol jet is utilized to drive the low molecular weight carrier gas at a subsonic velocity. As an example, using a steam jet expanded to sonic velocity, the drop in absolute temperature, and the conversion efficiency of heat power to kinetic power is of the order of 20%. The steam jet is converted to a charged aerosol as it emerges from the jet orifice. Moreover, while the charged aerosol steam jet is at Mach 1 or sonic velocity (for example about 520 meters/sec.) the low molecular weight gas carrier need be only at about 0.6 Mach to reach about the same velocity in the electrical conversion space. Elsewhere, the section of the torus may be increased, and the gas flywheel may revolve at an even smaller Mach number, thus making for very low frictional losses within the torus. The gas flywheel forms a part of a new electro-thermodynamic Rankine or Brayton cycle.

There are two loops; one for the vapor-liquid, and the second for the circulating carrier gas; and the charged aerosol is a combination of the two which formed at the entrance plane of the converter section. After discharge at the exit plane of the converter section, the charged aerosol returns to the vapor, or a liquid phase which is consolidated and circulates through an external liquid vapor loop, taking part in the thermodynamic cycle.

Analysis of a charged aerosol generator utilizing a Brayton cycle system operating between the temperatures of 1330° K. and 330° K. shows an overall heat-power to electric power conversion efficiency of about 50%. The Brayton cycle is completely analogous to a compressor-turbine system including a recuperator. Utilizing a low molecular weight charged aerosol gas of high electric breakdown strength, only two stages are required. In any case, a charged aerosol power converter having up to ten stages in series still represents a simple device.

The charged aerosol generator apparently does not have a critical size for optimum performance. Efficient charged aerosol generators are practical in sizes from about 1 kilowatt to the multimegawatt range.

Accordingly, an object of the invention is to provide a power conversion device in which the thermodynamically available input thermal power is substantially converted to electrical power output.

An object of the present device is to provide an electro-thermodynamic gas flywheel cycle using a charged aerosol as a working medium.

An object of the present device is to provide an electro-thermodynamic gas flywheel Rankine cycle using a charged aerosol as a working medium.

An object of the present invention is to provide an electrothermodynamic gas flywheel Brayton cycle using a charged aerosol as a working medium.

Another object of the present invention is the provision of a multiloop cycle using a charged aerosol as a working medium, in which the overall thermal-electric efficiency is high.

An object of the present invention is to provide an electrodynamic gas flywheel multiloop Rankine cycle using a charged aerosol as a working medium.

An object of the present invention is to provide an electrodynamic gas flywheel multiloop Brayton cycle, using a charged aerosol as a working medium.

Another object of the invention is to efficiently convert the thermal power of a superheated vapor flow to the kinetic power of a charged aerosol jet and to transfer said kinetic power to a driven gas.

Still another object of the instant invention is to continuously form and charge a charged aerosol moving at high velocities in which the input electrical power to form the charged aerosol is less than 0.1% of the output electric power.

Yet another object of the invention is to provide a charged aerosol power conversion device in which the driven gas moves at a subsonic velocity.

Still another object of this invention is to provide a power conversion device in which the output electrical power per stage is much higher than the friction power loss per stage.

Still another feature is the use of a carrier gas having a high electrical breakdown strength.

Another feature shown herein is the use of a carrier gas having a low molecular weight to increase operating gas velocity and decrease frictional losses.

A further feature is the directing a high velocity vapor jet into a moving carrier gas in the vicinity of gaseous ions to form a charged aerosol.

Another feature is the simultaneous formation and charging of a moving charged aerosol gas by cooling a vapor below its condensation temperature in the presence of ions, by mixture with a somewhat cooler gas.

Still another feature of the invention is the provision of a circulating driven gas stream into which is introduced vapor maintained above its condensation temperature, expanded to a high velocity, and condensed in the vicinity of a corona discharge to form a charged aerosol which efficiently transfers its kinetic power to the driven gas.

Another feature of the invention is the simultaneous charging and formation of a charged aerosol from a vapor issuing as a jet at about Mach number 1, into a moving carrier gas of greater cross section and smaller Mach number, in which the molecular weight of the vapor jet is greater than the molecular weight of the carrier gas, and the velocity of the vapor jet is only a little greater than the velocity of the driven gas.

A further feature of the invention is a conduit loop containing a carrier gas in which there is a jet orifice of a small cross section relative to the electrical converter cross section whereby the output electrical power is a major proportion of the available input thermal power of the jet, and the frictional power is a minor proportion which may be partly recovered.

A feature of the present invention is the provision of the power conversion device having predetermined operational parameters and structural embodiments therefor which result in an efficient conversion of available thermal power into electrical power via a charged aerosol working medium.

A feature of the invention is the provision of a plurality of parallel slits or openings in a conduit for directing a wedge-shaped vapor jet into the driven gas.

Another feature herein is the positioning of point or line ionizers of a corona discharge element in front of the wedge-shaped charged aerosol jet at a predetermined distance to form a charged aerosol essentialy uniformly throughout the entrance plane of the converter region.

Yet another feature of the invention is the provision of a charged aerosol power conversion device in which the surface areas of the electrodes are kept at a minimum to decrease frictional losses in the device.

Another feature of the invention is the provision of airfoil elements in the electrical conversion space of the device to decrease wall frictional power losses.

Among the design features of the invention is the provision of wire collector electrodes to discharge an aerosol by corona discharge.

The invention consists of the construction, combination and arrangement of parts described and claimed.

In the accompanying drawings forming part hereof, are illustrated several embodiments of the invention which similar reference characters designate corresponding parts in which:

FIGURE 2 shows a detail of the heat-kinetic electric power conversion device of the invention.

FIGURE 3 is an isometric view showing a detail of a part of the heat-kinetic electric power converter which produces a charged aerosol jet.

Figure 1:
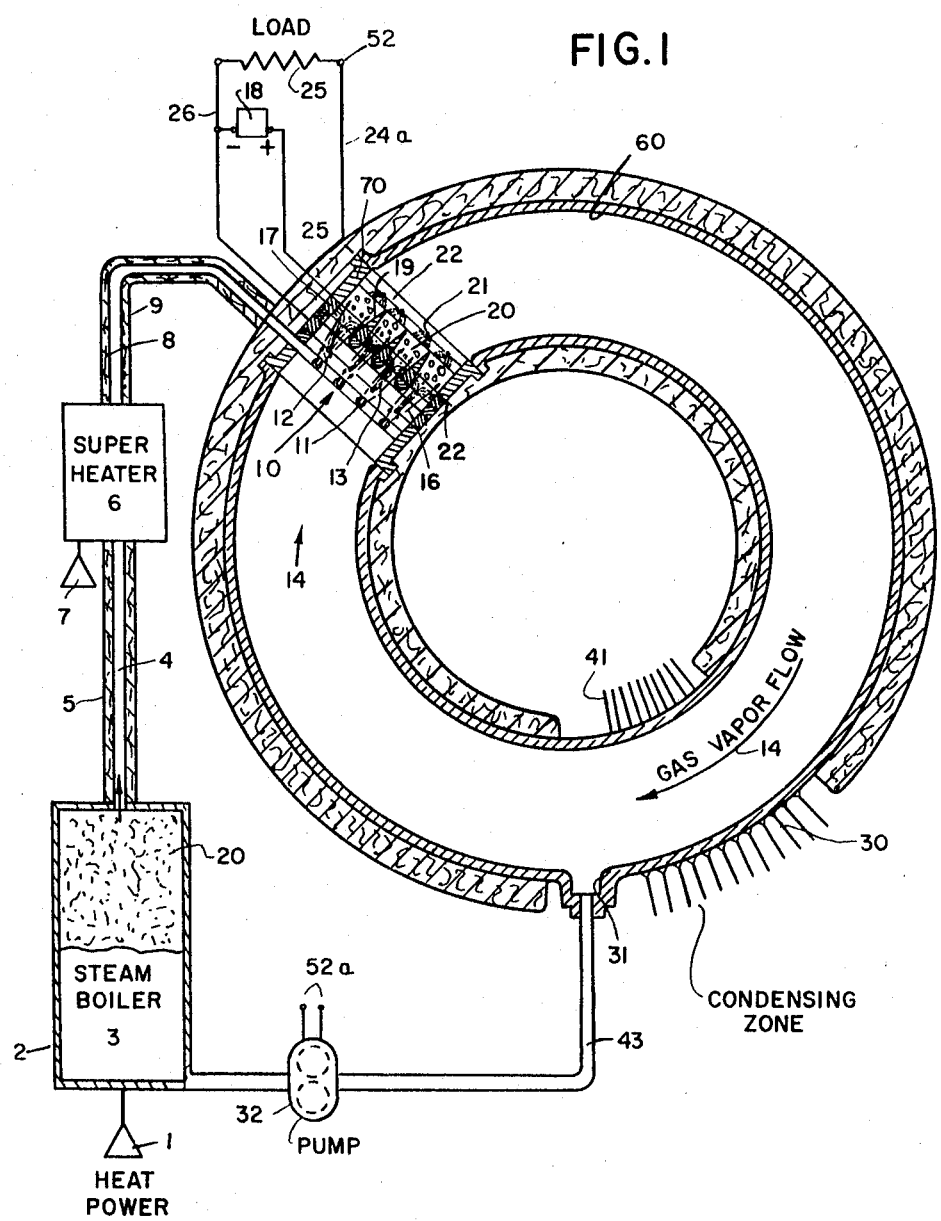
FIGURE 1 is a diagrammatic illustration of a gas flywheel power converter operating in a single stage electrothermodynamic Rankine cycle in accordance with the present invention.

Referring now to the drawings and more particularly to FIGURES 1-5, a gas flywheel device is shown, which employs a charged aerosol as a working substance or transducer, to convert the available thermal power input to electric power output.

A single stage cycle is shown in FIGURE 1. In this cycle heat power 1 is supplied to the boiler 2, containing a liquid 3 at elevated temperature and pressure. The liquid 3 is converted to a saturated vapor 4 which passes through insulated conduit 5 into a superheater 6 supplied with additional heat power 7. The pipe 9 supplies superheated vapor 8 to a number of smaller pipes 11 in the electric converter section 10. After electric power extraction in the gas flywheel device hereinafter described, the charged aerosol is discharged and most of the vapor is condensed at 31 at a lower temperature and pressure by condenser 30, and pumped back to boiler 2 by the liquid pump 32 which operates at a small fraction of the output electric power via terminals 52 connected across the load 25. The temperature of the superheated vapor 8 decreases substantially as its available heat power is converted to the kinetic power of the charged aerosol jet 13. Efficiency of conversion of available thermal power to electrical power is very high in the "condensation jet" because substantially all the temperature drop occurs in the jet which is directly converted to kinetic power and thence to electrical power.

In expanding, the vapor jet attains sonic velocity and converts its available thermal power with a substantial temperature drop, to kinetic power. The kinetic power transferred to the moving gas-aerosol stream is a small fraction of the circulating kinetic power of the gas flywheel; but substantially equal to the output electric power plus a small frictional power loss.

The vapor is superheated to a temperature such that upon expansion and cooling to form a jet, the vapor is in the supercooled state. By the supercooled state is meant a vapor which is capable of condensing onto a charged ion to form a charged aerosol particle. The saturation temperature of a vapor refers to a condition wherein the vapor will condense onto neutral particles. The temperature of the supercooled state for charged particles differs somewhat from the saturation temperature. Condensation occurs onto charged particles under what is normally considered a condition of superheat, and the charged particle grows larger more quickly as the saturation temperature is approached. Generally, the absolute temperature of the superheated vapor input to the jet is about 20% more than the absolute temperature of vapor of the jet in the supercooled state. Hence the heat power-kinetic power conversion efficiency of the jet is about 20% in one stage.

The power conversion section is generally indicated by reference numeral 10. The power conversion section 10 is located within an insulated torus-like conduit 60 which contains a circulating carrier gas 14. The vapor jet 12 issuing from the pipes 11, expands and supercools and increases to sonic velocity.

A charged areosol jet 13 is formed from the supercooled vapor jet 12 by condensation about ions within the carrier gas 14 in the region of high ion density provided by the corona about wires 16. The charged areosol jet 13 drives the carrier gas 14 around the torus 60. The rotating carrier gas 14 within the torus 60 is termed a gas flywheel. The kinetic power around the loop due to gas motion remains approximately constant except at the electric converter where the kinetic power is momentarily increased at a converging and diverging section; within which is located the electric converter 10. The friction power loss is minimized by operating at subsonic velocities; i.e. below Mach 1.

The available thermal power input of the superheated vapor is equated to the output electrical power plus the smaller frictional power loss of the gas in traversing the flywheel loop.

The thermal power input to the gas flywheel is provided by the flow of superheated vapor 8. Most of this available thermal power input is converted to electric power in the converter section charging electrodes 17, and the collector electrodes 21.

A low molecular weight carrier gas 14 is preferred; for example, hydrogen or a mixture of hydrogen and helium with a smaller proportion of known electron-scavengers, such as halogen, carbon tetrachloride, sulfur hexafluoride, etc. In addition to its function as a carrier gas, another advantage of using this mixture is that a gas leak will not form an explosive mixture with air. For example, the carrier gas may comprise a mixture of hydrogen and helium in the ratio of 45:45 together with 5 parts of water from the aerosol and 5 parts of an electron absorber compound, such as $SF_6$.

FIGURES 1–5 inclusive show a number of structures capable of converting the vapor jet into a charged aerosol.

In FIGURE 2 the electric conversion section is shown in more detail. The internal pipe 51 in the electric converter section 10 is a continuation of pipe 9. The pipe 51 feeds the pipes 11 with the superheated vapor 8. In particular, the pipes 11 are in the shape of an airfoil terminating in slit nozzles 15 from which wedge-shaped jets of supercooled vapor 12 are emitted, and from which the charged aerosol jets 13 are formed.

In the conversion space 20, the nozzle section 19 expands at a small angle such that velocity and/or temperature and pressure of the gas-aerosol at the collector electrode plane 23 is smaller than at the inlet plane 22.

The charging electrodes 17 provide a shield against the repelling electric field of the conversion space 20 which might otherwise prevent the formation of ions from the wires 16. Without ions the charged aerosol will not form.

The charge collector electrode 24 comprises a plurality of wires 21 mounted on a support frame 22*a* in the form of a screen which permits gas to flow with very little obstruction. The collector screen is positioned within conduit 60 at a position of high gas velocity, i.e., away from the walls. This arrangement prevents the electrical breakdown of the gas along the zero velocity gas layer which exists at the wall surfaces.

The charged aerosol droplets are discharged at the collector electrodes by a positive ion emission from the collector wires. The decrease in the heat-kinetic power and/or temperature-pressure of the gas is transduced into electric power. The electric power is applied between lead 24a and ground lead 26 across load 25.

A corona source is placed downstream of the slit orifice 15. The corona source may be point ionizers (not shown) or a corona wire 16. A corona discharge is maintained about the wire 16 by a potential difference relative to the charging electrode 17. The charging electrode 17 may be mounted on the airfoil sections 19. The corona discharge around the wire 16 emits ions in the vicinity of the supercooled vapor jet 12. The wire 16 may, for example, be a tungsten wire having a diameter of between $10^{-3}$ to $10^{-2}$ cm. positioned about $10^{-1}$ cm. from the slit orifice. The space between the airfoil sections 19 constitutes an expansion nozzle region within conduit 60.

The supercooled vapor jets 12 condense onto ions and form charged aerosol jets 13. The high velocity charged aerosol particles of the charged aerosol jet 13 intermix with the carrier gas 14, and the momentum of the charged aerosol jets 13 is transferred to the total body of moving gas-aerosol. The gas 14 is maintained at a velocity just a little less than that of the jets 13. The jets 13 are at about the sonic velocity corresponding to the temperature of the high molecular weight vapor from which they are formed. However, the gas 14 is then at a somewhat smaller velocity but only at a fraction of its sonic velocity because of the small mean molecular weight of the charged aerosol-gas mixture. For example, a gas mixture which contains predominantly hydrogen $H_2$ may have a mean molecular weight only a little greater than 2; say 3 or 4. The intermixture of the charged aerosol gas and the carrier gas is then also at a subsonic velocity. The Mach number of the vapor jet is of the order of 1 while the Mach number of the charged aerosol gas is a small fraction at nearly the same velocity and temperature. For example, for a sonic velocity jet of steam $H_2O$ (molecular weight 18), at 600° K. Mach 1 is equal to approximately 454 meters per second, while the resulting Mach number of the charged aerosol-gas mixture (mean molecular weight 3) at the same velocity is then $\sqrt{3/18}$ or about 0.41 Mach.

Figure 4:
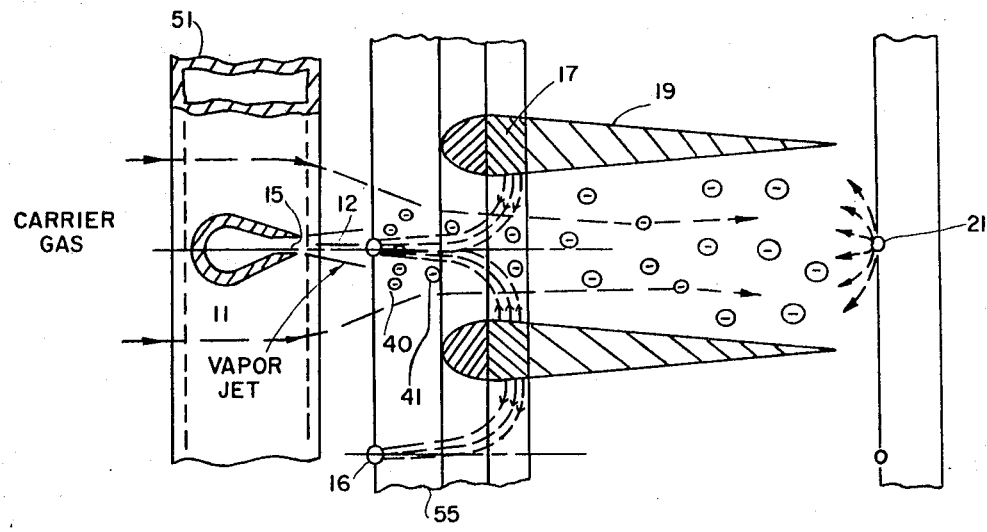
FIGURE 4 is an enlarged detail of a section of the device shown in FIGURE 2.

As shown more particularly in FIGURES 2 and 4, the vapor jet issuing from the slit initially has a small cross section relative to the cross section of the gas stream 14. For example, the slit opening $D_3$ may comprise about 10% of the diameter $D_2$ of the pipes 11. The distance $D_1$ between pipes 11, may be about ten times the diameter $D_2$ of each pipe. The slits in this case are 1% of the carrier gas cross-section. The gas flow encounters a minimum of frictional power loss due to wall friction on the pipes 11.

The carged aerosol jet issues with an angular spread from the flow axis and fills the conversion space at its entrance plane. Mutual repulsion of the aerosol particles produces a uniform distribution of charged particles in the stream within the conversion space 20.

During the expansion process, the superheated steam jet decreases in temperature. The gas 14 may be maintained at a somewhat lower temperature than the jet. The jet vapor may be cooled to the supercooled state by expansion alone and/or by mixing with the cooler carrier gas. In any case the super-cooled vapor forms charged aerosol particles in the presence of ions.

Once the charged aerosol-gas stream is formed in this manner, its heat-kinetic power is converted into electrical power in the conversion section 20, and discarged at the collector electrodes 21.

The charged aerosol jet-gas flywheel device of the invention enables a substantial fraction of the available input thermodyamic power to be matched to the output electric power with a single stage. A large temperature drop occurs at the jet orifice. The input jet power is predetermined by the small cross-sectional area of the input vapor nozzle while the electric power output is proportional to the relatively larger cross-sectional area of the gas-aerosol stream within the electrical conversion section.

The gas-aerosol operates at a high subsonic velocity in the electric conversion section particularly when a low molecular weight gas is employed.

FIGURE 3 shows an isometric view of an enlarged detail of FIGURE 2 in which pipe 51 feeds the smaller pipes 11 with superheated vapor. The superheated vapor issues from the slit nozzles 15 forming the supercooled vapor jet 12. The ionizer wires 16 are attached to the frame 55 which acts as common lead and which may be grounded to the gas flywheel device. The charging electrodes 17 on the airfoils 19 (not shown in this view) are maintained positive relative to the grounded wires 16. The potential difference is of the order of 2500 volts. A corona is established about the wire 16. Negative ions 40 are emitted as shown by the negative sign within the small circles. Supercooled vapor 12 condenses about the negative ions 40, forming large negative aerosol particles as indicated by the negative sign within the larger circles 41.

FIGURE 4 is still another view of the device shown in FIGURE 2 taken in section along the axis of flow to which previous descriptions apply and in which the same numeral designations are used.

Figure 5:
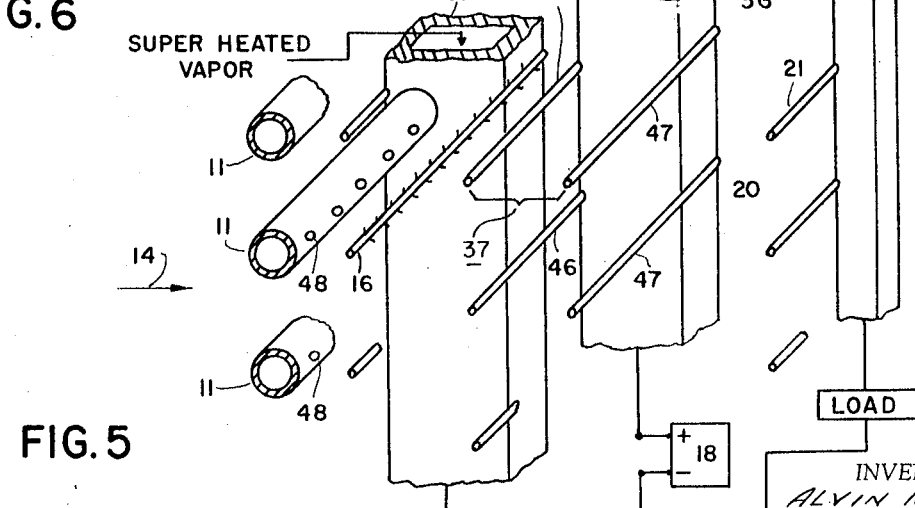
FIGURE 5 is an isometric view of another form of a charged aerosol electrothermodynamic converter according to this invention, utilizing wire electrodes.

FIGURE 5 is an isomeric view of the heat-kinetic power converter utilizing wire electrodes to replace the airfoil electrodes 19. Also in this view an alternate to the nozzle slits 15 previously described is shown in which the pipes 11 have a line of holes 48. The holes 48 emit a series of jets of circular section which merge into a wedge shaped jet of supercooled vapor, in the vicinity of the wire electrodes 16 whereupon charged aersol particles are formed in the manner previously described.

Fore and aft of the electrical converter section 10, the cross-section of the gas flywheel torus may be increased substantially so that much lower Mach numbers are achieved elsewhere around the loop, particularly through the condenser section 30. For example, the conduit cross section at 50 may be three times that at 49. The Mach number of the gas is of the order of 0.1 around the torus, except in the electrical converter 10 where it may be of the order of 0.7. The carrier gas enters the electrical converter 10 in a converging wall section 54. This causes the Mach number to increase as the electrical conversion region is approached. A high velocity of the carrier gas 14 is attained in the electrical conversion space 20, where it is necessary for substantial power conversion, and a minimum velocity of the gas flywheel is achieved elsewhere around the toric loop. Thus friction power losses are decreased to the order of a few percent. The carrier gas flowing in the converging and diverging nozzle surrounding the electrical converter 10 is always at a subsonic velocity. Because this flow is subsonic substantially no turbulence occurs, streamline flows persist and friction losses are thereby minimized.

The wire electrodes 46 and 47 occupy much less wall area than the airfoil sections 19 which they replace. The wire electrodes 46 and 47 may be mounted on the same metal frame 36.

The charging wire electrode 46 is placed forward of the throat section 49 in the expanding part of the nozzle 45. The region 48 between the input flow plane of the electrodes 46 and the output flow plane of the electrodes 47 is termed "drift space." Electrodes 46 and 47 are maintained at the same potential. The wire electrodes 46 constitute the charging electrodes which establish a potential difference relative to the wires 16, which may be maintained at ground potential. A corona discharge is produced about the wires 16 which is a source of ions. Charged aerosol particles form about each ion, as previously described.

The growth of the charged aerosol particle by condensation in the drift space 37, is favored by the following two conditions:

(1) In the distance along the drift space the space charge potential builds to a negative peak and then down again and there is no net power extracted. The charged aerosol particles grow in the time interval required to traverse the drift space 37 at the carrier gas velocity.

The charged aerosol particles grow to the critical radius for optimum mobility. In FIGURE 4 a similar result is obtained by placing the charging electrodes forward of the minimum throat section.

(2) The vapor continues to supercool in the drift space because of the expanding wall section 45.

Figure 6:
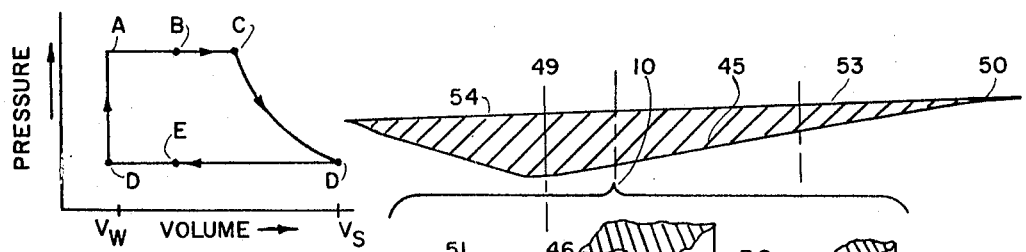
FIGURE 6 is a graph of the pressure-volume relationships in the device of FIGURE 1 during an electrothermodynamic Rankine cycle.

FIGURE 6 shows a conventional pressure volume diagram for the Rankine cycle through which the vapor component of the gas flywheel electrothermodynamic system passes. In this diagram A represents the volume and pressure of the liquid 3 in the boiler 2. Point B corresponds to the pressure and volume of the saturated vapor 4 and point C corresponds to the pressure and volume of the superheated vapor 8 which enters the feeder pipe 51. The line CD represents an isentropic expansion from the superheated vapor state to a temperature near saturation in the jet 12. This temperature is usually somewhat above the temperature at the saturation point, where normally no condensation would occur. However, in the presence of ions, the vapor is supercooled and condensation of the vapor jets 12 is induced about the ions, forming charged aerosol particles.

The jets 12 may be further cooled by intermixture with a somewhat cooler carrier gas which induces further supercooling and enhances charged aerosol particle growth.

The point E represents the condensation of a portion of the vapor jet in the liquid state in the form of charged aerosol particles. At point E a certain porportion of the vapor in the carrier gas 14 will remain as vapor and a portion will have condensed to form the charged aerosol particles.

At point D in the cycle liquid formed by condensation is consolidated by the condenser 30. Electrical power is supplied to the pump 32 by electrical leads 52a. The electrical power supplied to the pumps 32 is a minor part of the electrical power extracted at the conversion section. The pump increases the liquid pressure from point D to point A with substantially no change in volume. The liquid-vapor cycle of the gas flywheel is thus completed.

Figure 7:
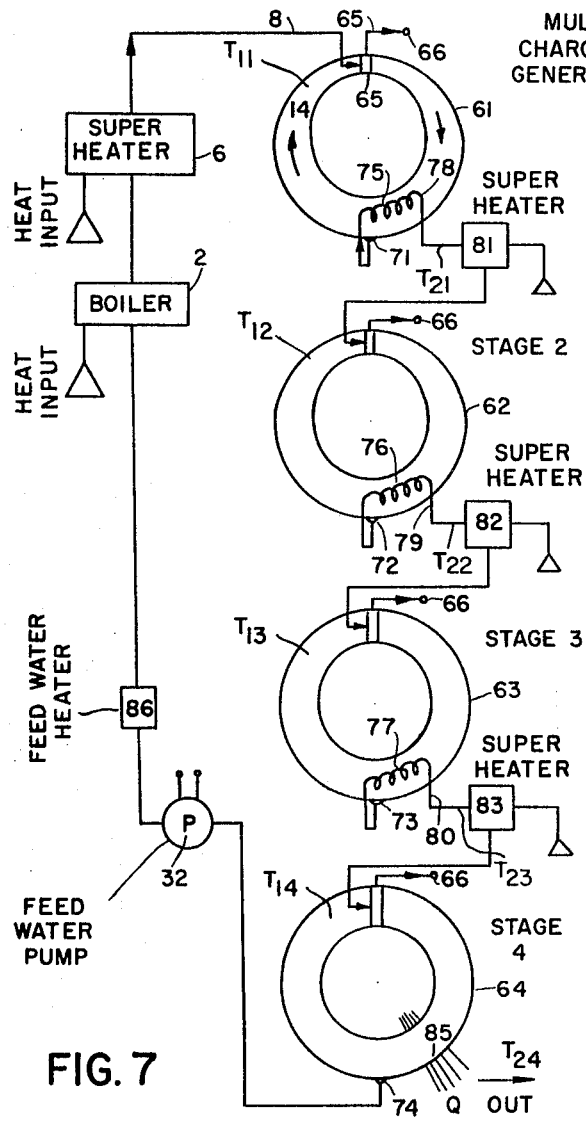
FIGURE 7 illustrates a multistage, multiloop power conversion system.

Referring now to FIGURE 7 there is shown a multistage multiloop electrothermodynamic Rankine cycle. In FIGURE 7 61, 62, 63 and 64 represent gas flywheel electrothermodynamic converters corresponding to stages 1, 2, 3 and 4. In the first stage superheated vapor 8 is converted to electrical power output 65 which is fed to a terminal 66 and then to a load not shown. The circuit is essentially the same as shown in FIGURE 1. The operation of all of the stages 61, 62, 63 and 64 is also the same as that shown in FIGURE 1 with certain modifications discussed hereinafter.

The stages 61, 62, 63 and 64 have electrical power outputs to the common lead 66. In each of these stages the discharged aerosol is condensed and returned to a consolidated liquid phase at the traps 71, 72, 73 and 74 respectively. In the stages 61, 62 and 63 regenerative condensers 75, 76 and 77 are employed. These condensers take the condensed liquid which has been cooled to the liquid state and pass the liquid back through the loop into a region of the torus closer to the electrical converter to convert this liquid back into vapor by extracting heat from the loop, and this vapor is utilized in the next stage after passing through a superheater. For example, at 71 the liquid is passed back into the condenser 75 toward 78. The upper end of the regenerative condenser 75 at 78 is at a somewhat higher temperature than the liquid at 71, and the liquid is thus converted to saturated vapor which enters the superheater 81. The superheater 81 is provided with source of heat input shown by the triangle. In like manner, the liquid condenser in stage 2 at 72 is heated in the regenerative condenser 76 to form saturated vapor 79 which enters the superheater 82 also supplied by a heat input source, and at stage 3 saturated vapor 80 from the regenerative condenser 77 enters the superheater 83 which is also supplied by heat input. The input termperature $T_{11}$ to the stage 1 gas flywheel is the temperature of the supersaturated vapor 8. $T_{12}$ corresponds to the temperature of the superheated vapor entering gas flywheel stage 2. $T_{13}$ corresponds to the input temperature of the superheated vapor entering gas flywheel stage 3 and $T_{14}$ corresponds to the input temperature of the supersaturated vapor entering gas flywheel stage 4. The temperatures $T_{11}$, $T_{12}$, $T_{13}$, $T_{14}$ and $t_{24}$ decrease successively. The output temperatures of the condensed saturated vapor is $T_{21}$ for stage 1, $T_{22}$ for stage 2, $T_{23}$ for stage 3 and $T_{24}$ for stage 4. The superheaters increase the temperature of the saturated vapor converting it to superheated vapor at constant pressure; thus temperature $T_{21}$ is increased to $T_{12}$; $T_{22}$ to $T_{13}$; and $T_{23}$ to $T_{14}$.

In stage 4 the condensed liquid at the trap 74 is pumped via liquid feed pump 32 through feed water heater 86 back to boiler 2 and thence via superheater 6 to form superheater vapor 8 at temperature $T_{11}$. This completes the cycle.

As an example, Table 1 shows the pressure in atmospheres and temperature in °K., for a four-stage electrothermodynamic Rankine cycle as above described. These values are illustrative, derived from a Temperature-Entropy diagram for water. Similar tables may be constructed with other values for water, and for other vaporizable materials.

In tis example, the input and output temperatures lie between 660° K. and 476° K. Superheated steam is used as the vapor. A low molecular weight inhibited carrier, predominantly hydrogen, is used as previously described. The cycle converts the available thermal power input into an electrical power output in accordance with the known thermodynamic characteristics of the system.

TABLE I.—AN EXAMPLE OF THE PRESSURES AND TEMPERATURES FOR ELECTROTHERMODYNAMIC RANKINE WITH FOUR STAGE CYCLE

| Stage No. | Atmospheres, $P_a$ | Temperatures | |
|---|---|---|---|
| | | Saturated, °K. | Superheated, °K. |
| Input: | | | |
| 1 | 183 | 633 | 666 |
| 2 | 100 | 583 | 626 |
| 3 | 55 | 544 | 588 |
| 4 | 30 | 508 | 539 |
| Output | 15.3 | 476 | |

While a four stage cycle has been shown, any number of stages may be employed.

Figure 8:
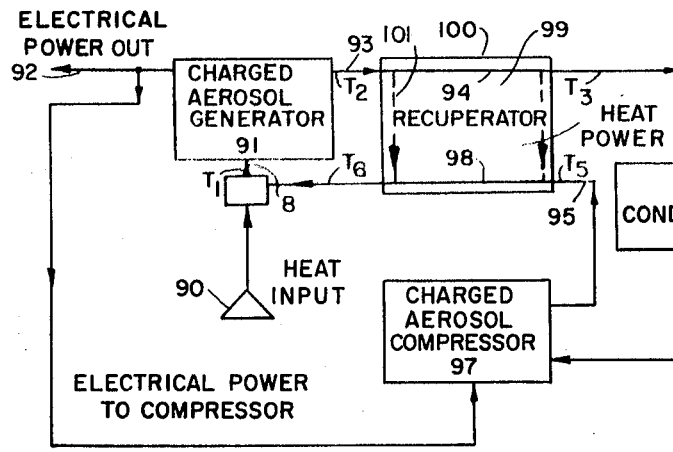
FIGURE 8 shows diagrammatically a charged aerosol generator, and a charged aerosol compressor operating in an electrothermodynamic Brayton cycle.

FIGURE 8 shows a block diagram charged aerosol electrothermodynamic Brayton cycle. A source 90 provides the heat input to the charged aerosol generator 91 at a temperature $T_1$, which converts the available portion to electrical power ouput 92. After passing through electrical converter section the neutralized gas 93 is at a temperature $T_2$. In passing through the recuperator 100 the heat is continuously given up by the gas until it cools to a temperature $T_3$. The heat which is released by the gas 93 is exchanged, continuously increasing the temperature of the input gas 95 to the charged aerosol generator. After leaving the recuperator at 99 the gas is at a temperature $T_3$. The unavailable heat is rejected by the condenser 96 to the atmosphere at temperature $T_4$ or to do further useful work in a subsequent stage at lower temperature. The cooled gas then enters the charged aerosol compressor 97 where it is compressed back to the input pressure of the charged aerosol generator at the temperature $T_5$. The charged aerosol compressor 97 is similar to the charged aerosol generator except that it is operating in reverse with an accelerating field, instead of a repelling field, in the conversion space 20. Upon passing through the recuperator section 98 the temperature is increased to temperature $T_6$. Finally by supplying additional heat power 90 the temperature of the gas is further increased to the input temperature $T_1$ at the electrical converter section 10. A proportion of the electrical power output is utilized to operate the charged aerosol compressor 97.

Figure 9:
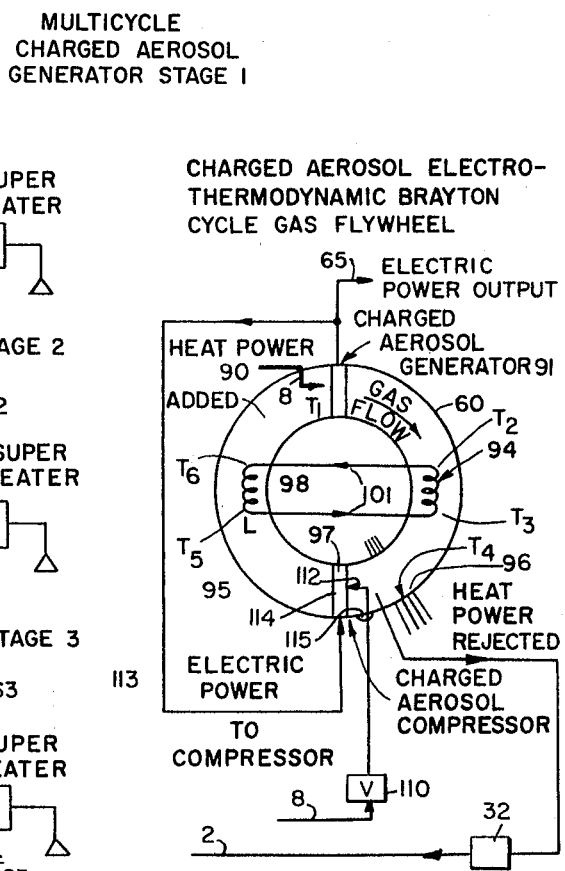
FIGURE 9 shows a charged aerosol electrothermodynamic converter according to this invention showing an electrothermodynamic generator and an electrothermodynamic compressor operating in the same gas flywheel in a Brayton cycle.

FIGURE 9 shows the same cycle described in FIGURE 8. Electrical power is extracted at 65 at the charged aerosol generator section 10 within the toric conduit 60.

The carrier gas with a small proportion of charged aerosol enters the electrical converter at temperature $T_1$. The cooler carrier gas from the electrical converter at temperature $T_2$ flows into the heat exchanger or recuperator 94, and emerges at temperature $T_3$. Heat at the lower temperature $T_4$ is rejected to the atmosphere or to the next stage at the condenser 96. Additional charged aerosol is formed in the charged aerosol compressor 97 which compresses the carrier gas back to the pressure at the input to the electrical converter section but at a lower temperature $T_5$. The heat exchanger 98 in the recuperator heats the gas back to the temperature $T_6$ which is just a little less than the temperature $T_2$ at the output to the charged aerosol generator. The heat exchanger coils 94 extract heat from the gas and add it to the gas at 95 via the heat exchanger coils 98. The coils 94 and 98 constitute the recuperator. The exchange in heat power from 94 to 98 within the recuperator is indicated by the arrow 101. The heat power input 100 raises the temperature of the gas from $T_6$ at the exit to the recuperator coil 98 back to the temperature $T_1$ at the entrance to the electrical converter section 10 and the cycle is complete.

In carrying out the electrothermodynamic gas flywheel Brayton cycle shown in FIGURE 9, the unique advantages of the charged aerosol for the introduction of heat power in the form of heat-kinetic power into a moving gas stream will become apparent. At the charged aerosol compressor, the heat power 100 is introduced from the heat source to boiler 3 and superheater 6 as described in connection with FIGURE 1. After formation the charged aerosol particles act as a heat-kinetic power transducer to electric power by transfer of their momentum to the gas-aerosol stream.

In the power conversion, the heat-kinetic power of the gas stream is extracted including the heat which was added in the recuperator 100.

In addition to the direct introduction of the heat power of the superheated vapor 8 into the gas as shown in the FIGURE 9, another method is by heat exchange through additional coils in the recuperator (not shown).

There are further advantages of using the charged aerosol condensation jet for the compressor.

In FIGURE 9 there is shown superheated vapor input to the charged aersol compressor. A portion of the superheated vapor from the superheater 6 is drawn off and passed through pressure reducing valve 110, to suitably lower the temperature and pressure of the superheated vapor so that the jet 112 issuing into the charged aersol compressor 97 will be supercooled and capable of condensing to form charged aerosol particles in the manner previously described.

The kinetic power of this jet is utilized to pump the gas back to the pressure at the input of the power converter 10 in one or several stages. The electric power 113 supplied to the charged aerosol compressor 97 is minimal, serving to add to the kinetic power of the charged aerosol jet and discharge the charged aerosol at the collector electrodes 114.

The neutralized charged aerosol issuing from the pump passes into the area 95 whereupon it evaporates as it passes through the recuperator coils 98 to form vapor which remains in the carrier gas entering the converter 10. However, upon completing the circuit and just before entering the compressor, the heat power that is rejected in the condenser at 96 causes a consolidation of the liquid at 115 whereupon this liquid is pumped by the pump 32 back to the boiler 3 as previously described in connection with FIGURE 1.

Various other modifications may be made to this system without, however, departing from the scope of this invention.

Since the mass ratio of liquid to air required to form a charged aerosol in the device of the present invention is very small, many electrical stages may be connected in sequence. In the case of many electrical converter stages, as the charged aerosol is discharged after each electrical stage, the neutral aerosol particles reevaporate and become available.

The efficiency of conversion of thermal power to electrical power depends upon a number of operational parameters. Several different conversion modes of thermal power to electrical power via charged aerosol working substance are available in accordance with this invention. An efficient conversion takes place when the temperature drop during expansion of the jet vapor occurs prior to the charged aerosol reaching the conversion space.

Under these conditions the available thermal power is converted directly into kinetic power of the resultant stream. The efficiency of this thermodynamic conversion process is limited by that of the ideal, reversible process; for which it is $\Delta T/T$, about 20% for a single loop.

In the conversion space the kinetic power of the aerosol stream may be converted to electric power at a constant thermodynamic state by decreasing velocity U and increasing the cross section A of the conversion space, so that the product AU is constant. This process is herein termed Mode A.

Another method of converting the available heat power of the gas-aersol stream into electrical power in the conversion space 28, employs a decrease in temperature at constant velocity and is termed "Mode B." In practice Modes A and B occur together.

It is preferred to operate at least in part in Mode B to induce supercooling in the conversion space. This enables the attainment of a higher electric breakdown strength, resulting in greater electric power densities, lower frictional power losses relative to electric power density, lower operating pressures, and a higher velocity of the carrier gas, as will be apparent from examples hereinafter given.

The overall efficiency for a single stage, single loop gas flywheel generator is given by the product of the heat to kinetic power efficiency of the jet and the heat-kinetic power of the charged aerosol gas to electric power efficiency. An overall efficiency of about 14% per stage, taking into consideration friction power losses, may be attained.

The following is a mathematical-physics analysis showing the ratio of cross section of the jet to that of the carrier gas, to equate the input jet power to output electric power plus a small friction power loss.

TABLE OF SYMBOLS

MKS ° K. units are used.

$A_r$=Ratio of the cross sectional area of the jet orifices to the cross section of the electric converter at the throat.

$C_0$=Friction factor.

D=Distance between airfoil walls.

$\delta_{ag}$=Relative density of the carrier gas.

$\delta_{aj}$=Relative density of the vapor jet as it issues into the carrier gas.

$\eta' = \eta + C_0\,(L/D)$.

$\eta_f = \rho_f/\rho_\epsilon$=the friction/electric power loss ratio, or the ratio of the friction power density to the output electric power density.

$\eta_k = \rho_\epsilon/\rho_k$; electric/kinetic power conversion ratio, or the ratio of the output electric power density to the kinetic power density of the charged aerosol gas.

$M_g$=Mach number of carrier gas.

$M_j$=Mach number of vapor jet.

$m_g$ = Mean molecular weight of carrier gas.
$m_j$ = Mean molecular weight of jet vapor.
$m_{rg}$ = Mean molecular weight of carrier gas relative to air (28.8).
$m_{rj}$ = Molecular weight of the jet vapor relative to air (28.8).
$p_e$ = Electric power density in conversion space.
$p_j$ = Kinetic power density across jet.
$p_k$ = Kinetic power density.
$p_f$ = Friction power density loss.
$U_g$ = Carrier gas velocity.
$U_j$ = Jet vapor velocity.

The kinetic power density of the carrier gas stream is $$p_k = 1 \cdot m_{rg} \delta_o \delta_{ag} U_g^3 \qquad (1)$$

The jet power density per unit cross section of the carrier gas stream is:

$$p_j = A_r m_{rj} \delta_p \delta_{aj} U_j^3 \qquad (2)$$

The relative carrier gas density and velocity is equal to that of the jet vapor:

$$\delta_{aj} \cong \delta_{ag}$$

and $$U_j \cong U_g \qquad (3)$$

The jet power density is equated to the output electric power density and the friction loss power density:

$$p_j = p_e + p_f \qquad (4)$$

The friction power density may be expressed in terms of the kinetic power density:

$$p_f = C_o(L/D) p_k \qquad (5)$$

By definition:

$$p_e = \eta p_k \qquad (6)$$

From Equations 4, 5 and 6:

$$p_j = [\eta + C_o(L/D)] p_k = \eta' p_k \qquad (7)$$

Hence:

$$\eta' = \eta + C_o(L/D) \qquad (8)$$

From Equations 1, 2 and 7:

$$\eta' = p_j/p_k = A_r(m_{rj}/m_{rg}) \qquad (9)$$

$$A_r = \eta'(m_{rg}/m_{rj}) = \eta'(m_g/m_j) \qquad (10)$$

A study has shown that:

$$\eta_f \eta_k \cong 0.01 \qquad (11)$$

The Mach number of the gas at the same temperature and having approximately the same ratio of specific heats, is inversely proportional to the square root of its molecular weight. Consequently for a vapor jet of molecular weight, $m_j$ issuing into a carrier gas of molecular weight $m_g$ at approximately the same velocity and temperature, the Mach number of the carrier gas $M_g$ relative to the Mach number of the vapor jet $M_j$ is given by the following:

$$M_g = M_j (m_g/m_j)^{1/2} \qquad (12)$$

EXAMPLE

Given: $\eta' = 0.10$
  Mean molecular weight of carrier gas = 3
  The jet vapor is $H_2O$ (M.W. = 18)
Find:
  (a) $A_r$
  (b) What is $A_r$ for $\eta' = 6\%$
  (c) What is the Mach number of the carrier gas
Solution:
  (a) $A_r = \eta' 3/18 = \eta'/6$
  (b) For $\eta' = 0.06$ $$A_r = 0.06/6 = 0.01$$

(c) $M_g = 1\sqrt{3/18} = 0.41$

Various carrier gases such as hydrogen, air, or other gas may be employed with or without electron or ion scavengers as above described.

Various materials may be employed for the vapor jets. Amongst these are water, organic alcohols, glycerine, diphenyl chlorides, mercury, alkali metals and the like.

For output electric power at 100 kv., the airfoil array is miniature with a conversion space dimension L between 0.5 and 1.5 mm.

So that a large charged aerosol droplet radius be not required, and to obtain a large current density, it is preferred that the charged aerosol velocity equal or exceed 300 m./s. The gas velocity in the conversion space should be of the order of 0.7 Mach for subsonic flow and minimized friction. To avoid excessive heavy wall sections, it is preferred that the relative gas density be less than about 200. Only certain compositions and operating conditions meet these criteria.

For example, given: $\eta_k = 1$ and $\eta_f = 0.01$, and a power density of $10^8$ watts/m.$^2$, these criteria are met only with a hydrogen-water charged aerosol mix spark-inhibited with an electron attaching gas or with an inhibited and supercooled hydrogen-water charged aerosol. The velocities are 302 m./s. and 470 m./s., and the relative densities are 89 and 24 respectively.

However, if $\eta_k = 0.25$ and $\eta_f = 0.04$, and with a power density $10^6$ watts/m.$^2$, the criteria are met only by an inhibited, supercooled hydrogen-water charged aerosol, at an operating velocity of about 326 m./sec. with a relative density of 28. On the other hand, if the output power density is increased to $10^8$ watts/m.$^2$, then suitable compositions and operating conditions are: a pure hydrogen-water charged aerosol operating at a velocity of 409 m./sec. with a relative density of 144; an inhibited hydrogen-water charged aerosol at 523 m./sec. and a relative density of 67; an air-water charged aerosol which has been inhibited and supercooled at a relative density of 13.3, operating at 372 m./sec. at a high operating temperature for subsonic operation; and an inhibited and supercooled hydrogen-water aerosol which has been operating at 817 m./sec. and at a relative density of 19.5.

For $\eta_k = 0.10$ and $\eta_f = 0.10$, the criteria are met, at a power density of $10^6$ watts/m.$^2$ by an inhibited hydrogen-water charged aerosol, operating at a velocity of 302 m./sec. and a relative gas density of 88.5, and by an inhibited and supercooled hydrogen-water charged aerosol, operating at a velocity of 470 m./sec. and a relative gas density of 23.6. For a power density of $10^8$ watts/m., the criteria are met with a pure hydrogen-water charged aerosol, at an operating velocity of 590 m./sec. at a relative density of 120; with an inhibited air-water charged aerosol, operating at a 346 m./sec., and a relative gas density of 41.5 (this velocity is just about sonic under standard conditions, but is subsonic at higher temperatures); with an inhibited hydrogen-water aerosol, operating at 756 m./sec. at relative gas density of 55; and with an inhibited and supercooled hydrogen-water aerosol operating at high gas velocity of 1180 m./sec., and a gas density of 13.5.

Summarizing these results:

(1) Using a charged aerosol having a high electric breakdown strength due to the employment of an electron attracting carrier gas, and/or a supercooled vapor therein, and in which the mean molecular weight of the carrier gas is small, there is achieved:
  (a) The largest operating velocity,
  (b) The smallest relative gas density,
  (c) The greatest electric-kinetic conversion ratio,
  (d) The smallest friction-electric loss ratio.

(2) A gas-aerosol velocity of more than 300 m./s. and less than 0.7 Mach, and a relative gas density of less than 200 (and as low as 10) is attainable with a greater range of charged aerosol-gas-compositions at electrical power densities in excess of $10^6$ watts/m.$^2$ and preferably of the order of $10^8$ watts/m.$^2$.

(3) For output voltages of the order of 100 kv. and under the specified operating conditions, a miniature airfoil array, with a conversion length of the order of 1 mm. is required.

(4) An unprecedentedly great power conversion concentration. For 10 kw./cm.$^2$ in a cube of 1 cm.$^3$ at a mean density of 5 gm./cm.$^3$, the power concentration in the electrical converter is of the order of 1 megawatt/kg.

(5) The gas flywheel enables a large temperature drop to be achieved per stage, and enables the high power density input of a jet of small cross section to be matched with an electric converter of larger cross section but of smaller power density.

(6) A greater temperature drop is achieved by multi-staging gas-flywheel converters at successively lower temperatures.

(7) With a single stage electrothermodynamic gas flywheel Brayton cycle a high overall efficiency of about 40% is achievable.

Having thus fully described the invention what is claimed as new and sought to be secured by Letters Patent of the United States is:

1. An electrothermodynamic gas flywheel power conversion device comprising a conduit loop, a carrier gas of low molecular weight under pressure within the conduit loop, a source of supply of superheated vapor connecting with the interior of the conduit loop, a first nozzle within the conduit to receive the superheated vapor and emit a directed jet of supercooled vapor, an ion source within the supercooled jet whereby a charged aerosol is formed within the carrier gas, a power conversion section within the conduit comprising a second nozzle and collector electrodes for discharging said aerosol, charging electrodes at the entrance of said conversion section, a source of potential connected between the charging electrodes and the ion source, an electrical load connected between the collector electrodes and the ion source, whereby a substantial portion of the kinetic power of the vapor jet is converted to electrical power while the remainder of said kinetic power drives the gas around the conduit loop, a condenser in the conduit loop for condensing the discharged aerosol into a liquid, a boiler and a superheater as a supply source for the superheated vapor, and means to return the condensed liquid to said boiler and superheater.

2. A power conversion device according to claim 1 in which a supercooled vapor jet of high power density and small cross section is matched to a driven carrier gas in which a charged aerosol in the conversion space of large cross section converts electric power at low power density.

3. A conversion device according to claim 1 in which the carrier gas is substantially driven by the momentum of the charged aerosol particles.

4. A charged aerosol device according to claim 1 in which the carrier gas contains a spark inhibitor whereby a high electrical breakdown strength and greater electrical power output is obtained.

5. A conversion device according to claim 1 in which the carrier gas is hydrogen and the vapor is water.

6. A conversion device according to claim 1 in which the charged aerosol and vapor within the carrier gas is maintained in a supercooled condition by the expansion of the gas in the converter region within the second nozzle whereby a high electrical breakdown strength and greater electrical power output is obtained.

7. A conversion device according to claim 1 in which the carrier gas operates at a subsonic first velocity and the vapor jet operates at a second velocity which is nearly sonic, said second velocity being somewhat greater than said first velocity, whereby frictional power losses are minimized.

8. A conversion device according to claim 1 in which the conduit loop is decreased in cross section at the converter section to operate at a subsonic velocity between 0.3 and 0.9 Mach at said converter section and a much smaller velocity between 0.1 and 0.3 Mach in the remainder of the loop.

9. An electrothermodynamic gas flywheel power converter utilizing the charged aerosol as a working medium according to claim 1, incorporated in a Rankine cycle.

10. An electrothermodynamic gas flywheel power converter utilizing the charged aerosol as a working medium according to claim 1, incorporated in a Brayton cycle.

11. An electrothermodynamic gas flywheel power converter utilizing the charged aerosol as a working medium according to claim 1, in a multiloop cycle.

12. An electrothermodynamic gas flywheel power converter utilizing the charged aerosol as a working medium according to claim 1, in a multiloop Rankine cycle.

13. An electrothermodynamic gas flywheel power converter utilizing the charged aerosol as a working medium according to claim 1, in a multiloop Brayton cycle.

14. An electrothermodynamic gas flywheel power converter utilizing the charged aerosol as a working medium according to claim 1, in which the charged aerosol is obtained by mixing the vapor with a somewhat cooler carrier gas in the presence of ions.

15. In a charged aerosol power conversion device according to claim 1 an ion source comprising a conduit having a slit parallel to the axis of the conduit, and from which there issues a wedge-shaped vapor stream, a corona wire in the proximity of said slit and parallel thereto within said vapor jet stream and charging electrodes downstream of said wire.

16. A device according to claim 1 in which the downstream charging electrodes constitute two wire screens at the same potential, one slightly further downstream than the other and in which cross-sectional change of the second nozzle is attained at the wall constituting the conduit.

17. A charged aerosol electrothermodynamic Brayton cycle gas flywheel in accordance with claim 1 in which heating and cooling sections of the recuperator are included in the conduit loop and in which the compression portion of the Brayton cycle is achieved by utilizing a proportion of the output electric power from the charged aerosol power converter section applied to a charged aerosol pump as a compressor of the carrier gas.

References Cited
UNITED STATES PATENTS 3,225,225  12/1965  Wattendorf et al. _____ 310—5

J D MILLER, Primary Examiner

D. X. SLINEY, Assistant Examiner

U.S. Cl. X.R.

310—5, 11